(12) United States Patent
Neumeier et al.

(10) Patent No.: US 12,555,548 B2
(45) Date of Patent: Feb. 17, 2026

(54) SYSTEMS AND METHODS FOR ENHANCING TELEVISION DISPLAY FOR VIDEO CONFERENCING AND VIDEO WATCH PARTY APPLICATIONS

(71) Applicant: Vizio, Inc., Irvine, CA (US)

(72) Inventors: Zeev Neumeier, Berkeley, CA (US); W. Leo Hoarty, Morgan Hill, CA (US); John Schindler, Irvine, CA (US)

(73) Assignee: Vizio, Inc., Irvine, CA (US)

( * ) Notice: Subject to any disclaimer, the term of this patent is extended or adjusted under 35 U.S.C. 154(b) by 144 days.

(21) Appl. No.: 17/676,181

(22) Filed: Feb. 20, 2022

(65) Prior Publication Data

US 2022/0270556 A1    Aug. 25, 2022

Related U.S. Application Data

(60) Provisional application No. 63/151,109, filed on Feb. 19, 2021.

(51) Int. Cl.
*G09G 3/34* (2006.01)
*G09G 3/3225* (2016.01)

(52) U.S. Cl.
CPC ......... *G09G 3/3426* (2013.01); *G09G 3/3225* (2013.01); *G09G 2320/062* (2013.01);
(Continued)

(58) Field of Classification Search
CPC ............ G09G 3/3406; G09G 2360/14; G09G 2320/062; G09G 2320/0626; G09G 2320/0646; G09G 2320/0686
See application file for complete search history.

(56) References Cited

U.S. PATENT DOCUMENTS

| 9,041,697 B2 | 5/2015 | Soto |
| 9,148,627 B2 | 9/2015 | Anderson et al. |

(Continued)

FOREIGN PATENT DOCUMENTS

| CN | 201282586 Y | 7/2009 |
| CN | 102314840 B | 8/2014 |

(Continued)

OTHER PUBLICATIONS

English translation of CN102314840 from Total Patent One.
(Continued)

*Primary Examiner* — Dennis P Joseph
(74) *Attorney, Agent, or Firm* — DICKINSON WRIGHT RLLP; Hector A. Agdeppa

(57) ABSTRACT

The present disclosure relates to a system and method for controlling a television display in such a matter that some portion of that display is re-purposed as a light emitting device intended to provide improved video scene lighting when using a video camera associated with the television display for communications as part of video conferencing or other activities. The systems and methods of the disclosure may be activated and controlled utilizing the television's remote-control device or a paired mobile device, using manual or verbal commands from the user. This results in an overall brightening of the television display or a reduction of that portion of the screen displaying the current programming, thereby exposing remaining pixels that can be independently illuminated to a greater brightness and color tinted. This action improves the illumination of the video scene area of those subjects in front of the television.

34 Claims, 11 Drawing Sheets

(52) U.S. Cl.
CPC ............... *G09G 2320/0626* (2013.01); *G09G 2320/0686* (2013.01)

(56) References Cited

U.S. PATENT DOCUMENTS

| | | |
|---|---|---|
| 9,344,681 B2 | 5/2016 | Block et al. |
| 9,628,538 B1 | 4/2017 | Leske et al. |
| 9,681,099 B1 | 6/2017 | Deets, Jr. |
| 9,838,208 B2 | 12/2017 | Backer |
| 9,935,987 B2 | 4/2018 | Badar-Natal et al. |
| 9,961,119 B2 | 5/2018 | Badar-Natal et al. |
| 10,491,579 B2 | 11/2019 | Yoakum |
| 10,567,448 B2 | 2/2020 | Badar-Natal et al. |
| 10,644,894 B2 | 5/2020 | Backer |
| 2008/0267095 A1 | 10/2008 | Sekaran et al. |
| 2012/0182384 A1 | 7/2012 | Anderson et al. |
| 2013/0031475 A1 | 1/2013 | Maor et al. |
| 2014/0136999 A1 | 5/2014 | Leibovich et al. |
| 2014/0173467 A1 | 6/2014 | Clavel et al. |
| 2015/0231494 A1 | 8/2015 | Chang et al. |
| 2018/0102912 A1 | 4/2018 | Backer |
| 2018/0227337 A1 | 8/2018 | Badar-Natal et al. |
| 2018/0270277 A1 | 9/2018 | Blanchard et al. |
| 2018/0312964 A1 | 11/2018 | Dillon et al. |
| 2020/0201512 A1 | 6/2020 | Faulkner et al. |
| 2020/0201522 A1 | 6/2020 | Faulkner et al. |
| 2020/0351562 A1 | 11/2020 | Siddique et al. |
| 2021/0118404 A1* | 4/2021 | Bartscherer ............ H04N 23/74 |
| 2022/0130022 A1* | 4/2022 | Li ............................ G06T 5/008 |

FOREIGN PATENT DOCUMENTS

| | | |
|---|---|---|
| CN | 110047442 A | 7/2019 |
| DE | 102018121566 B4 | 3/2020 |
| EP | 2237538 A1 | 10/2010 |
| EP | 2482273 A1 | 8/2012 |
| WO | 2005036878 A1 | 4/2005 |
| WO | 2007100419 A1 | 9/2007 |
| WO | 2009132084 A1 | 10/2009 |
| WO | 2016049482 A1 | 3/2016 |
| WO | 2019060338 A1 | 3/2019 |

OTHER PUBLICATIONS

English translation of CN201282586 from Total Patent One.
English translation of CN110047442 from Total Patent One.
English Translation of DE102018121566 from Google Patents Machine Translation.

* cited by examiner

SYSTEMS AND METHODS FOR ENHANCING TELEVISION DISPLAY FOR VIDEO CONFERENCING AND VIDEO WATCH PARTY APPLICATIONS

CROSS-REFERENCE TO RELATED APPLICATIONS

This application claims the benefit of U.S. Provisional Patent Application No. 63/151,109, filed on Feb. 19, 2021, the entirety of which is hereby incorporated by reference.

FIELD

This disclosure relates generally to systems and methods intended to enhance the video conference calls and multiple user video applications such as "video watch parties," and more specifically, relates to systems and methods for using the visual display as a light source to selectively illuminate a subject.

BACKGROUND

Many workplaces have discovered the advantages of enabling some of their staff to work remotely using video camera-equipped laptops or mobile phones. However, households had little use for face-to-face communications beyond what was commercially available utilizing numerous social-media-oriented mobile apps. A significant drawback with video conferencing using portable or handheld personal devices is that the screens are small and such portable devices usually require the participant to be sitting at a table or desk to be able to keep the image steady.

Meanwhile, in many living rooms, the primary household television set has been steadily increasing in size and pixel resolution. Properly augmented with a video camera and suitable microphones or microphone arrays, modern television sets could enable family members to participate in video conferencing type calls from the living room couch or other comfortable area. This potentially enables home users to participate in interactive video conferences for remote employment or educational applications, as well as to participate in video watch parties, multiplayer games, or other interactive applications.

While such systems have long been used in business settings for remote conferencing, use at home has lagged due to concerns that many participants may have regarding their personal appearance on the other group call attendees' television displays. One obstacle to more wide-spread adoption of televisions for these purposes is that the lighting typically available in most living rooms is not optimal for those who are being videoed. Poor in-room lighting may present the user in a less than flattering way, particularly in comparison to the appearance of people being videoed in well-lit offices or studios. Attempting to mimic such dedicated lighting in a residential room setting can be expensive, cumbersome, and unsightly in a family room setting, and few consumers are interested in purchasing additional lighting systems and disrupting the living room's appearance with stands and cables.

There is a need for improvements in the way home television systems can be used for face-to-face interaction with other remote viewers. These interactions may be for such activities as work-from-home, remote education, visits with family and friends, or remote group viewing of sporting events, movies, or other activities such as games. In recent years, advances in light emitting diode (LED) technology have significantly progressed in all applications of lighting. LEDs have virtually replaced the incandescent light bulb and can be found throughout the home. LEDs are found in streetlights, on traffic lights, on vehicle head- and taillights, and on video displays. The modern flat-panel video displays have advanced significantly in their applications of LED technology in pursuit of ever wider black-to-white dynamic range, as well as color purity, in response to the demands of the market. LED panel manufacturing processes such as the quantum dot technology and others like it have greatly increased the maximum brightness of individual LED elements of the display device allowing for much greater brightness from the display panel thus further contributing to the enablement of this disclosure. Therefore, using the television set's existing screen pixels as a form of a studio lighting device would enhance the home use experience.

BRIEF DESCRIPTION OF THE DRAWINGS

The present disclosure is illustrated by way of example and not limitation in the accompanying figures, in which like references indicate similar elements, and in which.

In the drawings, like numerals refer to like parts.

DETAILED DESCRIPTION

Figure 1A:
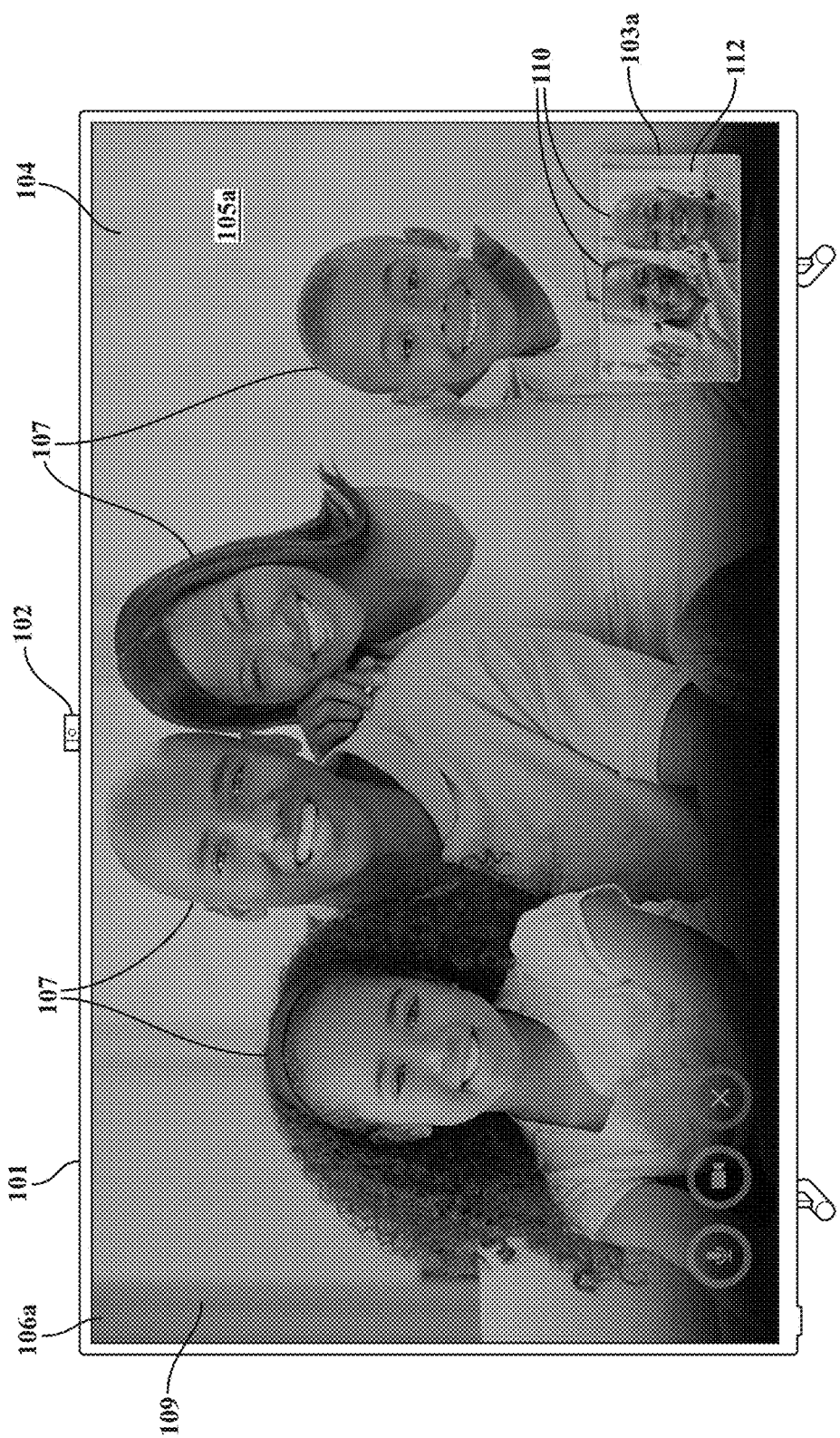
FIG. 1A is a front elevational view of a video display showing an interactive video conference of a family chatting with their relatives at a remote location.

To address the problem of adequately lighting a video call, the person or persons in front of the video camera in a residential type setting can utilize the systems and methods taught by this disclosure to increase the lighting and color of the lighting in the room where the television is located using either the television's remote control or a paired mobile device with manual or voice operated controls to adjust subject lighting provided by the television itself.

Described herein are systems and methods for using the pixels of a video display, such as an LCD (liquid crystal display) or OLED (organic light emitting diode) television display, as an adjustable source of lighting for a subject in the field of view of a camera associated with the display. In modern television and video display systems, the display comprises an array of pixels, and when aggregated across the display, the color and brightness of the pixels define an image displayed to the viewer. The numbers of pixels are often quite large. TV resolutions are specified by the number of pixels across a horizontal and vertical axis. Thus, a 1080×1920 display will have 1080 rows and 1920 columns of pixels and a total of 2,073,600 pixels.

The pixels may comprise subpixels, one for each of the colors red (R), green (G), and blue (B). Among the parameters that define a pixel, are the pixel brightness or luminance, and RGB values. In the RGB model, colors are characterized as combinations of red, green, and blue, and the relative intensities of each of those colors will define the color that is emitted from the pixel. In typical implementations, each color has 256 possible values (i.e., $2^8$) ranging from 0-255.

In typical LCD televisions, the sub-pixel elements do not themselves emit light. Instead, the subpixels act as filters for plane polarized light, dictating how much light will pass through the subpixel. As a result, a light source is needed to project light through the subpixels. Most common television displays employ a backlighting scheme that consists of rows of thin, parallel fluorescent tubes that run the width of the display panel, this technology is known to the skilled person as cold-cathode fluorescent light (CCFL). In more expensive LCD panels, groups of red, green, and blue LEDs create white light and there may be, for example, 32 groups of RGB clusters to illuminate the entire LCD panel from behind. In yet another example, clusters of RGB LEDs line the edges of a display panel and shine into a white plastic light spreader that evenly diffuses the light behind the LCD panel. There are still other means to vary backlighting behind an LCD panel to enhance the contrast in a color image that are not relevant to this disclosure.

The backlight source of many known LCD displays collectively has an adjustable intensity, but not a variable one across the array. So, all the LEDs will have the same intensity, although it can be varied. However, LCD TVs with independently controllable LED backlight zones also exist. For example, VIZIO supplies "P-Series Quantum" 4K HDR Smart TVs with 210 independently controllable backlight zones. The LEDs comprising each zone may have their intensities varied independently of the other zones. In LCD TVs with either single or multiple zone LED backlighting, the emitted intensity from the pixels will depend on the supplied white light intensity provided by the backlight and the RGB subpixel values of each pixel.

In contrast, an OLED display comprises pixels that are self-illuminating and which need no backlight. Each RGB subpixel can itself be controlled to emit light of the corresponding color at, typically, 256 levels ranging from 0-255.

Each pixel can also be characterized by a luminance (Y) value and RGB values. RGB values are intensities, which can be expressed based on the range of their digital representation, e.g., R=175, B=110, G=200, and as a percentage of the range of their digital representations, e.g., R=68, G=43, 78. The luminance (Y) value for a pixel is a gray scale intensity value which can also be represented as a weighted function of the R, G, and B intensities. A given luminance value can be provided at different ratios of R, G, and B to one another.

During video conference calls, each participant will typically have a video monitor and an associated camera used to feed images of the participant to other conference call participants. If the participant is not well-lit, he or she will not be clearly visible to other participants. The present disclosure results from the discovery that the pixel parameter values on a video display can be adjusted to selectively illuminate the subject. In one embodiment, the intensity of the light emitted from the video display pixels can be adjusted to illuminate the subject. In the same or additional embodiments, the picture being displayed can be shrunk to free up a frame of border pixels, and the border pixels can be set to white to provide additional illumination. In certain examples, the luminance values of the display pixels are first increased until reaching a maximum desired level, and then borders of white pixels are used and are progressively increased in size (as the picture progressively shrinks in size) to try to reach the desired level of subject illumination.

A video conferencing system configured to selectively illuminate a subject being recorded or live-streamed will now be described with reference to FIG. 1A. As shown therein, subjects (a family) 107 in a surrounding environment 109 are shown on a flat screen television 101 during a video conference call with remotely-located relatives shown in an on-screen window 103a on the flat screen television 101. Thus, on-screen window 103a also displays subjects 110 in an environment 112. Flat screen television 101 comprises a display 104 and is equipped with a video camera 102 that is operatively connected to the television 101 and which may be integral to the television set or separately attached and connected to the television's processing apparatus. Display 104 comprises a plurality of video display pixels and displays images that are segmented into a main portion 105a and the on-screen window 103a.

In FIGS. 1A-1D, flat screen television 101 is being viewed by subjects 110 shown in on-screen window 103a. Subjects 110 are in the field of view of camera 102, which live-streams subjects 110 to a different TV being viewed by subjects 107.

The term "picture field" may be used to refer to a subset of video display pixels that comprise the extent of the image(s) being displayed on display 104. In FIG. 1A the picture field 106a comprises all the video display pixels, and its pixels are co-extensive with those of display 104. The video display pixels define an array of pixels, and each pixel has at least one video display pixel parameter associated with it. In preferred examples, the at least one video display pixel parameter includes an emitted pixel luminance (Y). In the same or other examples, the at least one video display pixel parameter includes RGB subpixels color values ranging, for example, from 0-255. The display 104 in FIG. 1A is a liquid crystal display. Flat screen television 101 also comprises an LED backlight that includes an array of LEDs, each of which projects light to one or more of the video display pixels.

Figure 1B:
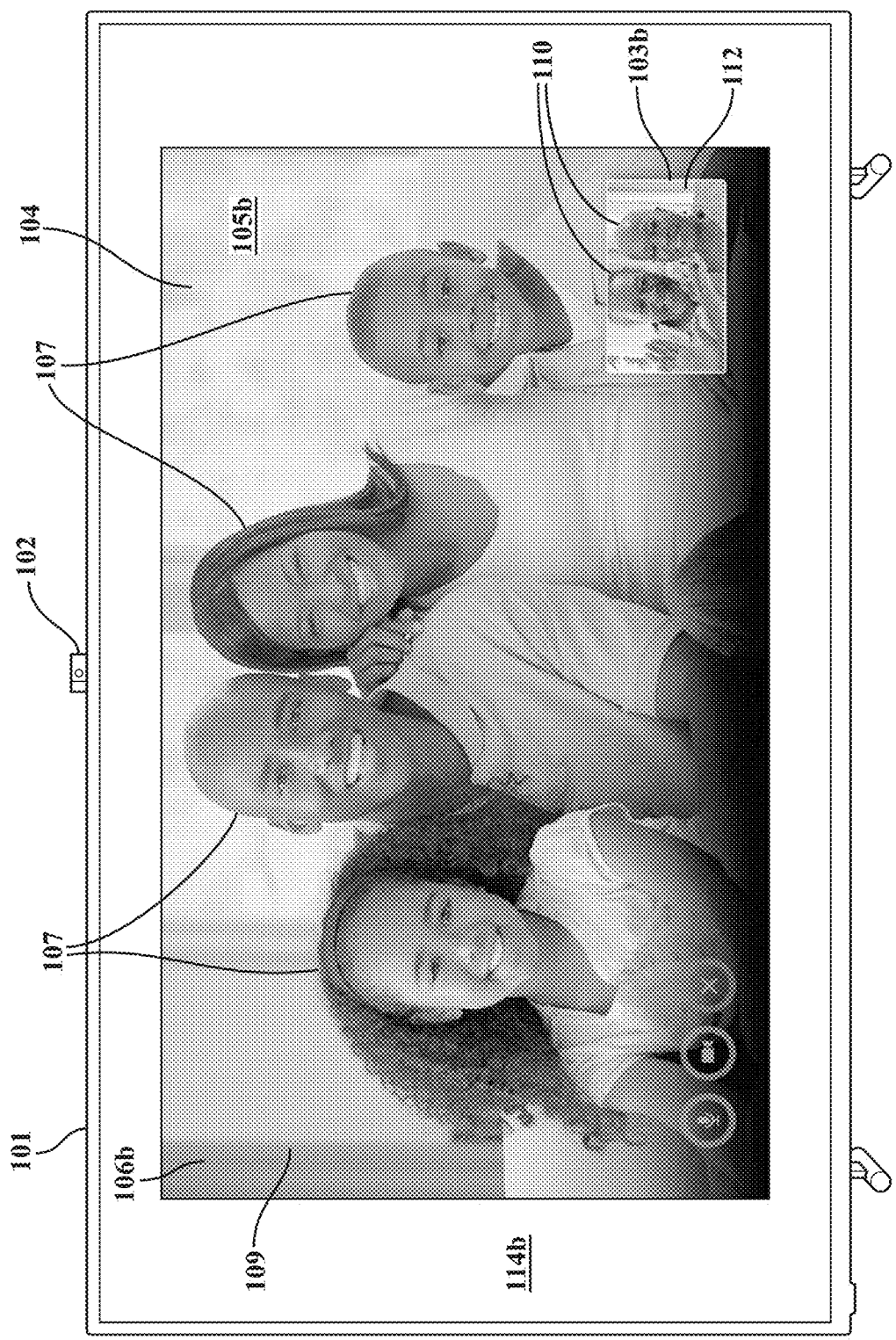
FIG. 1B depicts the video display device of FIG. 1A in which the picture being displayed has been shrunk to provide a rectangular border frame of white pixels used to illuminate a subject being live-streamed and/or recorded during the video conference.
Figure 1C:
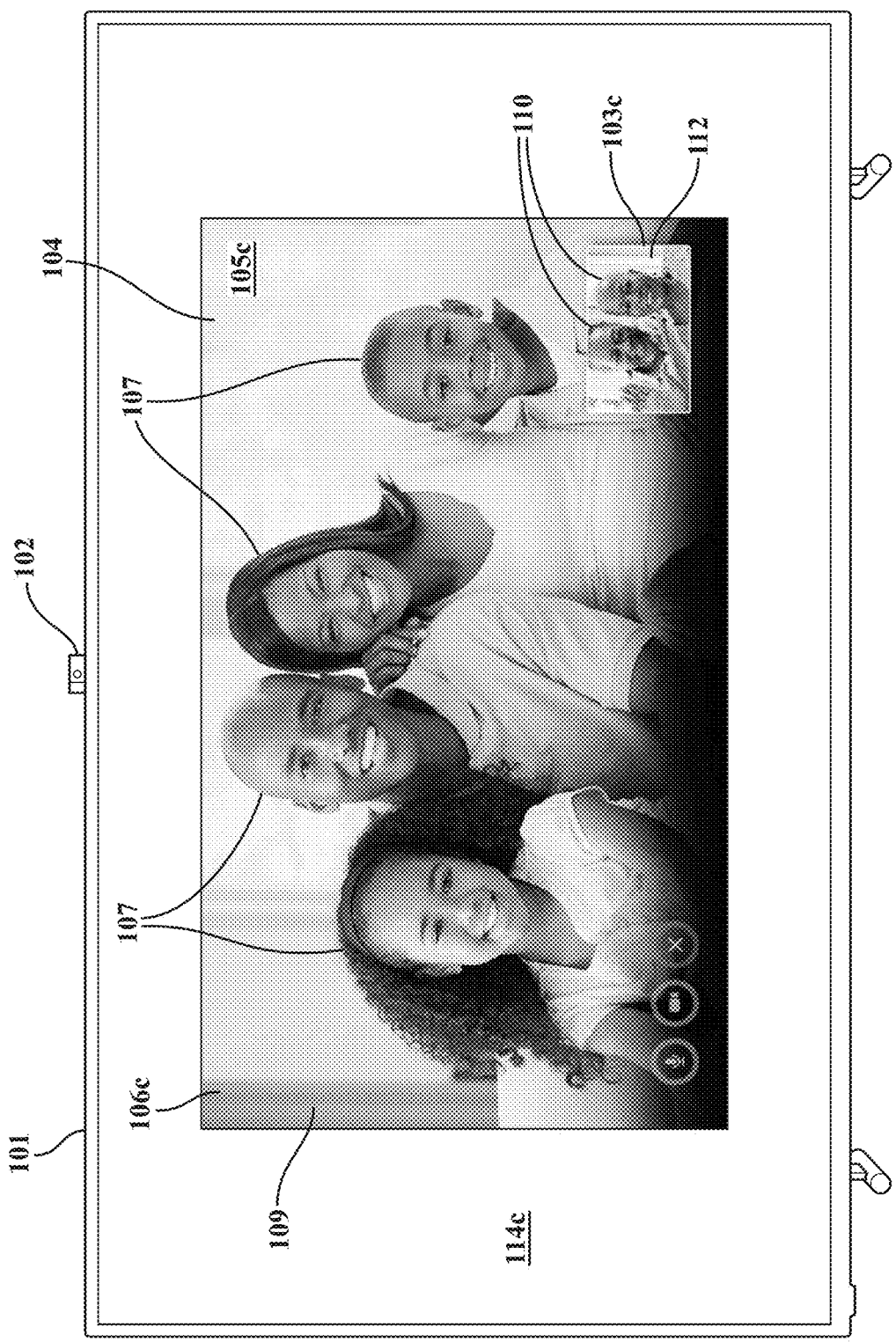
FIG. 1C shows the same scene as FIG. 1A, only with a wider border pixel frame to create additional subject lighting.
Figure 1D:
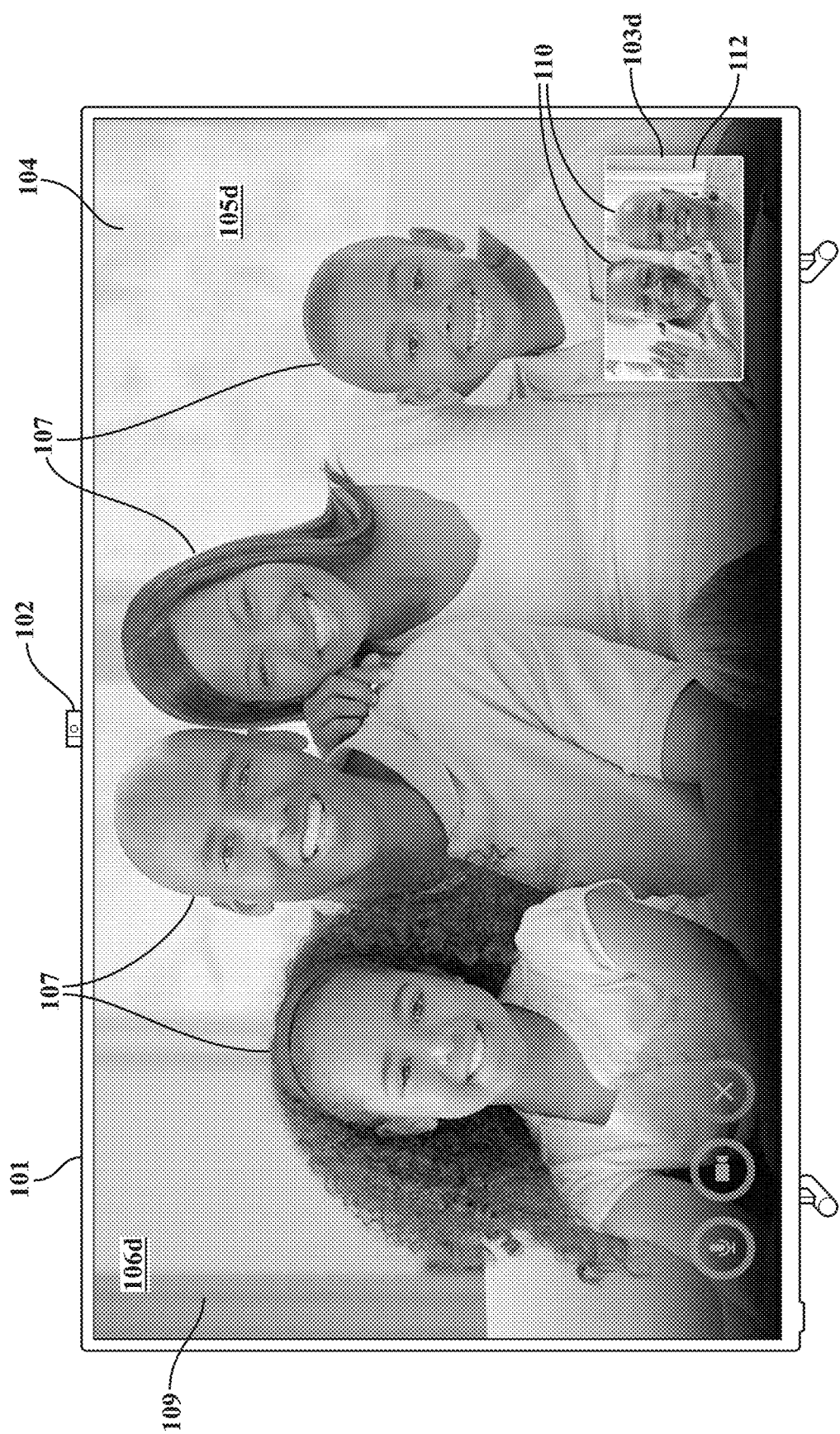
FIG. 1D depicts an alternative embodiment by which the entire video display device of FIG. 1A is used to increase subject lighting.

Referring to FIG. 1D, flat screen television 101 is again depicted, but this time display 104 has video display pixels that have an adjusted value of at least one video display pixel parameter relative to FIG. 1A. The reference numerals in FIG. 1D are the same as those in FIG. 1A but some of them have a "d" appended to them to refer to areas in which the appearance of the relevant portions of the television 101 has been altered relative to FIG. 1A. In the case of FIG. 1D the adjusted value of at least one video display pixel parameter is an adjusted value of the pixel luminance (Y). Relative to FIG. 1A the luminance of the video display pixels in FIG. 1D has increased sufficiently to appreciably increase the intensity of the light emitted from display 104 which is incident on subjects 110. As a result, subjects 110 are illuminated more brightly in FIG. 1B than in FIG. 1A. Subjects 107 in main portion 105d are also more brightly illuminated than in main portion 105a of display 104 in FIG. 1A. Because of the increased incident light upon them, subjects 110 will appear brighter (e.g., have increased luminance) in the on-screen window 103d of TV 101 than in on-screen window 103a in FIG. 1A. This increased luminance may alter the contrast between the main region 105d and on-screen window 103d. Thus, in certain examples, the RGB values for the pixels in display 104 will be adjusted to maintain the same color balance in main region 105a. In other examples, where the change in luminance is significant, it may also alter the color balance within on-screen window 103a, in which case the RGB values in on-screen window 103a may also be adjusted to maintain its color balance.

In using the technique of FIG. 1D, at least one parameter of the video display pixels of the television or video display being watched by a subject who is simultaneously being recorded or live-streamed by a camera operatively connected to that television or video display is adjusted to achieve a desired level of incident light upon that subject. As flat screen television 101 includes an LED backlit LCD panel, the video display pixel luminance (Y) values in FIG. 1D are increased relative to those of FIG. 1A by increasing the LED backlight intensity ($I_{BL}$). At least one controller operatively connected to display 104 carries out the video pixel parameter adjustments and image processing and analysis used to guide the adjustments. TV 101 has at least one processor and at least one non-transitory computer readable medium having instructions stored on it which, when executed by a computer, carry out the analyses of images captured by camera 102 and the adjustment to at least one video display pixel parameter value. In certain examples in which multiple LED backlight zones are provided, the LEDs around the edge of picture field 106d may be increased relative to the remaining pixels to adjust the illumination of the subject. In other examples involving OLED TVs, zone specific intensity increases may also be used to enhance subject illumination because they allow for pixel-specific intensity adjustments.

In preferred examples, the adjustment to the at least one video display pixel parameter value is based on at least one captured image pixel parameter value for subjects 110 exclusive of environment 112. The image or images used for the analysis are captured by camera 102. Using known techniques, such as facial recognition techniques, the at least one pixel parameter value used to determine the size of the frame of border pixels 114b is at least one pixel parameter value for those pixels in the captured image which define subjects 107 and not for the pixels defining environment 112. Thus, the subject pixels are evaluated exclusive of the surrounding environment pixels. In certain examples, the captured subject pixel luminance (Y(x, y)) values are used to calculate an average captured subject pixel luminance ($Y_{avg}$) intensity for pixels defining subjects 110, and the adjustments to at least one video display pixel parameter value are made based on a comparison between $Y_{avg}$ and a setpoint or desired average captured pixel luminance value ($Y_{sp}$) for subjects 110 exclusive of environment 112.

In the case of an OLED display and the technique of FIG. 1D, instead of adjusting a backlight intensity, the luminance of each pixel is preferably adjusted to achieve a desired level of incident light on subjects 110. However, this may alter the color balance of the picture field 106a of TV 101. Thus, the RGB values are preferably adjusted to provide the same perceived colors to the viewer. Techniques for adjusting RGB values based on a pixel luminance to achieve the same color balance are known to those skilled in the art and include adjusting the luminance value (the Y signal) of a video frame image, which is a ratio metric adjustment of the final RBG values of a pixel.

It should be noted that many current televisions have ambient light sensors that are point sensors, and the LED backlight intensities are automatically adjusted to compensate for changes in ambient lighting without regard to distinguishing the subject from the surrounding environment. In the case of the technique depicted in FIG. 1D, such controls would preferably be overridden so that the LED backlight intensities may be adjusted to achieve a desired level of subject lighting.

The enhancement of subject illumination using the technique of FIG. 1D may be constrained by the degradation in contrast between the images of the subjects 107 and 110 relative to their respective surrounding environments 109 and 112 in both in the main portion of display 104 and in the on-screen window 103d of display 104. The degradation in contrast can make the subjects look "washed out". Thus, in certain exemplary embodiments, a maximum value of the at least one video display pixel parameter may be set. In certain examples, the maximum value may be a maximum value of any pixel luminance among the video display pixels comprising the subject. In other examples, the maximum value is a maximum average video display pixel value ($Y_{avg\ max}$) across all of the video display pixels, those comprising the picture field, or those comprising subject(s).

FIGS. 1B-1C depict the use of another method of illuminating a subject. In certain examples, and as illustrated in FIG. 1B, when the foregoing constraint is reached but additional subject lighting is desired, the picture field 106a of FIG. 1A is reduced in size to a scaled, reduced picture field 106b to preferably maintain the same relative dimensions of within the picture field 106a. Algorithms for performing the size reduction are known to those skilled in the art. Referring to FIG. 1B, picture field 106b is not co-extensive with the display 104. Rather, the size of picture field 106b is smaller than the size of both display 104 and picture field 106a of FIG. 1A.

The reduction in size of picture field 106b creates a rectangular frame of border pixels 114b within display 104. The sizes of main portion 105b of display and on-screen window 103b are also reduced in a scaled manner relative to main portion 105a and on-screen window 103a, respectively, in FIG. 1A. In preferred examples, the RGB values for each border pixel in rectangular frame 114b are set to equal values, and increased together in value to produce bright white light where the brightest available light will be when the RGB values are each set to 100 percent of their maximum values (R=255, G=255, and B=255 in the case of eight-bit values). Changing the brightness of light around picture field 106b can change the perceived color balance and reduce the apparent contrast of a scene within the picture field 106b. Thus, in certain examples, the RGB values and/or luminance (Y) values of pixels within the resized picture field 106b are altered to create a brightened picture such that the human image perception of the relative brightness of the overall video display is maintained. In LCD TVs with single zone LED backlighting, the luminance backlight intensity can be adjusted, but cannot be varied in the picture field 106b relative to the rectangular border pixel frame 114b. However, in the case of multiple zone backlights, and depending on the particular backlight configuration, it may be possible to increase the backlight intensity in the rectangular border pixel frame 114b relative to the picture field 106b, and in certain examples, it is preferable to maximize it. In the case of OLED TVs, this can also be done as each pixel has an independently adjustable luminance and RGB values.

In preferred examples, the border pixels are each adjusted up to their maximum RGB values, as needed to illuminate the subject(s) in front of the camera mounted on the TV and the number of border pixels 114b is adjusted based on at least one captured image pixel parameter value for subjects 110 exclusive of environment 112. In one example directed to LCD TVs with independently adjustable LED backlight zones, the intensities of the border pixels are maximized to provide maximum backlighting for a given size of the rectangular border pixel frame 114b. In examples, involving OLED TVs, the intensities of the pixels in rectangular border pixel frame 114b are also preferably maximized.

In some examples, a predictive algorithm may be used to determine how many border pixels—and at what luminance value—are required to achieve a desired level of subject illumination, and the border frame may be sized accordingly. In that case the border 114b size will dictate the reduction in the size of the picture field 106b. In other examples, a feedback control system may be employed in which the border size is progressively increased, and images are captured from camera 102 to assess the sufficiency of the subject illumination. In further examples, a viewer may use a remote control or other device to request an adjustment to the size of rectangular frame 114b and may progressively change the size until an acceptable level of subject illumination is achieved.

As can be seen in FIG. 1B, in certain examples, the user can command an increase in subject lighting whereby the video display area 104 has been reduced in size by means of scaling the picture to, for example only, 80% of its original dimension, exposing a certain percentage of the screen pixels, here shown located as border pixels 114b around the perimeter of the picture of host television's screen 104. In the case of an LCD television, the LCD pixels would each be associated with an LED on an adjacent LED backlight, and the border pixels 114b subpixel values (RGB) would be set to be equal RGB values to transmit white light. The magnitudes of the RGB values would also be adjusted to provide maximum white light intensity (e.g., R, B, and G each equal 100 percent of their maximum value, which would be 255 in the case of an eight-bit value). In the case of an OLED TV, the perimeter pixels would be set to equal values, and their magnitudes adjusted to adjust the intensity of white light generated by the perimeter pixels. In either case, the perimeter pixels define a "subject lighting region," which is a region of the video display area 104 used to illuminate the subject being recorded by camera 102.

The system of the present disclosure enables the user to easily alter the luminance and color values displayed by those pixels in a manner such that the people facing the television are made easier to see by remote viewers. In preferred examples, TV 101 allows users to make progressive increases in subject lighting intensity. Thus, in FIG. 1C, in response to a command to further increase lighting, the video display area 104 has been further reduced (scaled down), thus freeing up additional pixels as border pixels 114c to increase the area of the subject lighting region and brighten up the faces of the subjects 110 as they interact with subjects 107. As a result, subjects 110 are noticeably brighter in FIG. 1C as compared to FIG. 1D. In certain examples, the command to increase lighting causes the average subject pixel luminance setpoint ($Y_{sp}$) to increase.

Figure 2A:
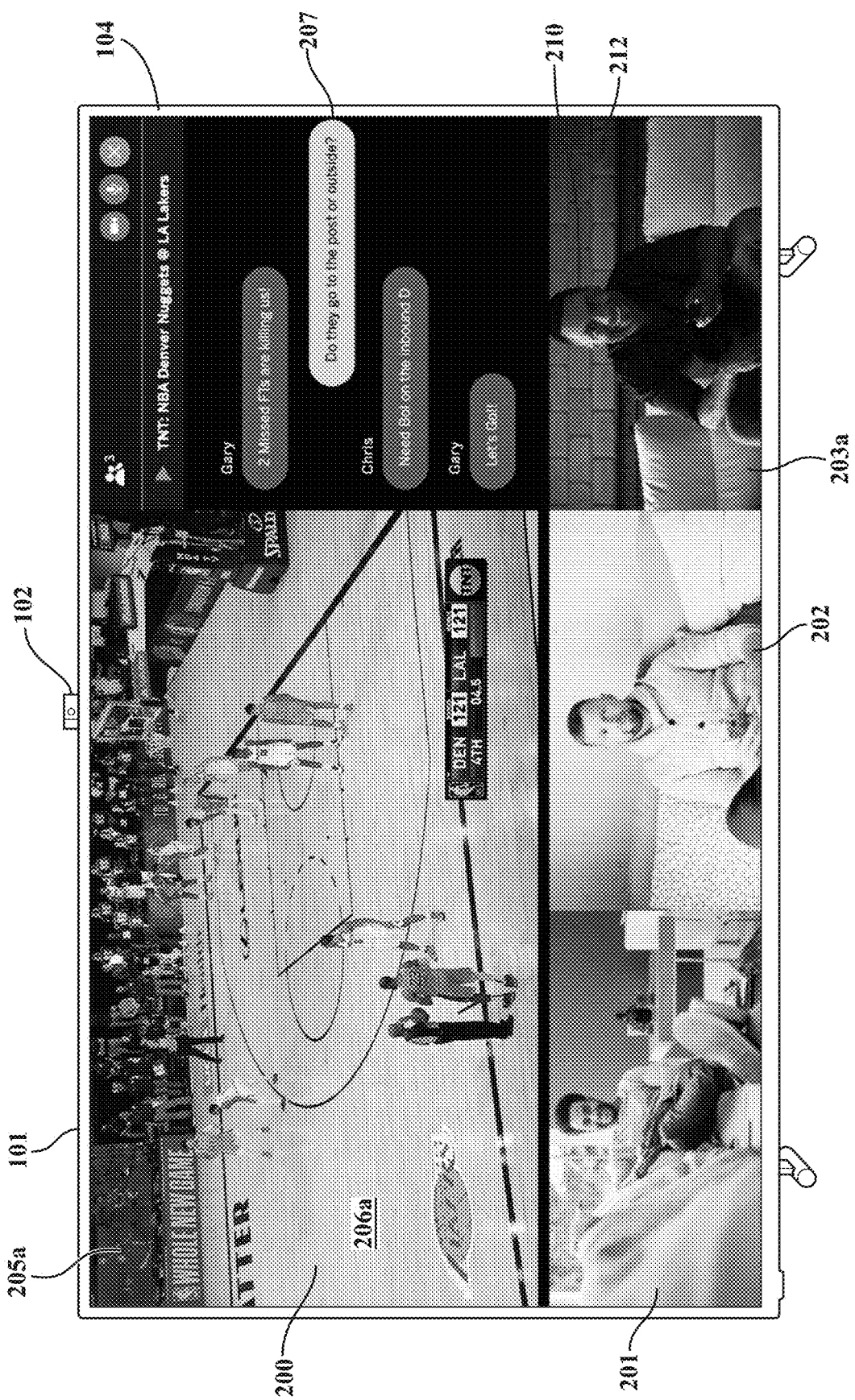
FIG. 2A depicts a front elevational view of a video display showing a video watch party with the program of interest displayed in one portion of the screen and video images of the persons attending from various remote locations displayed in independent windows.
Figure 2B:
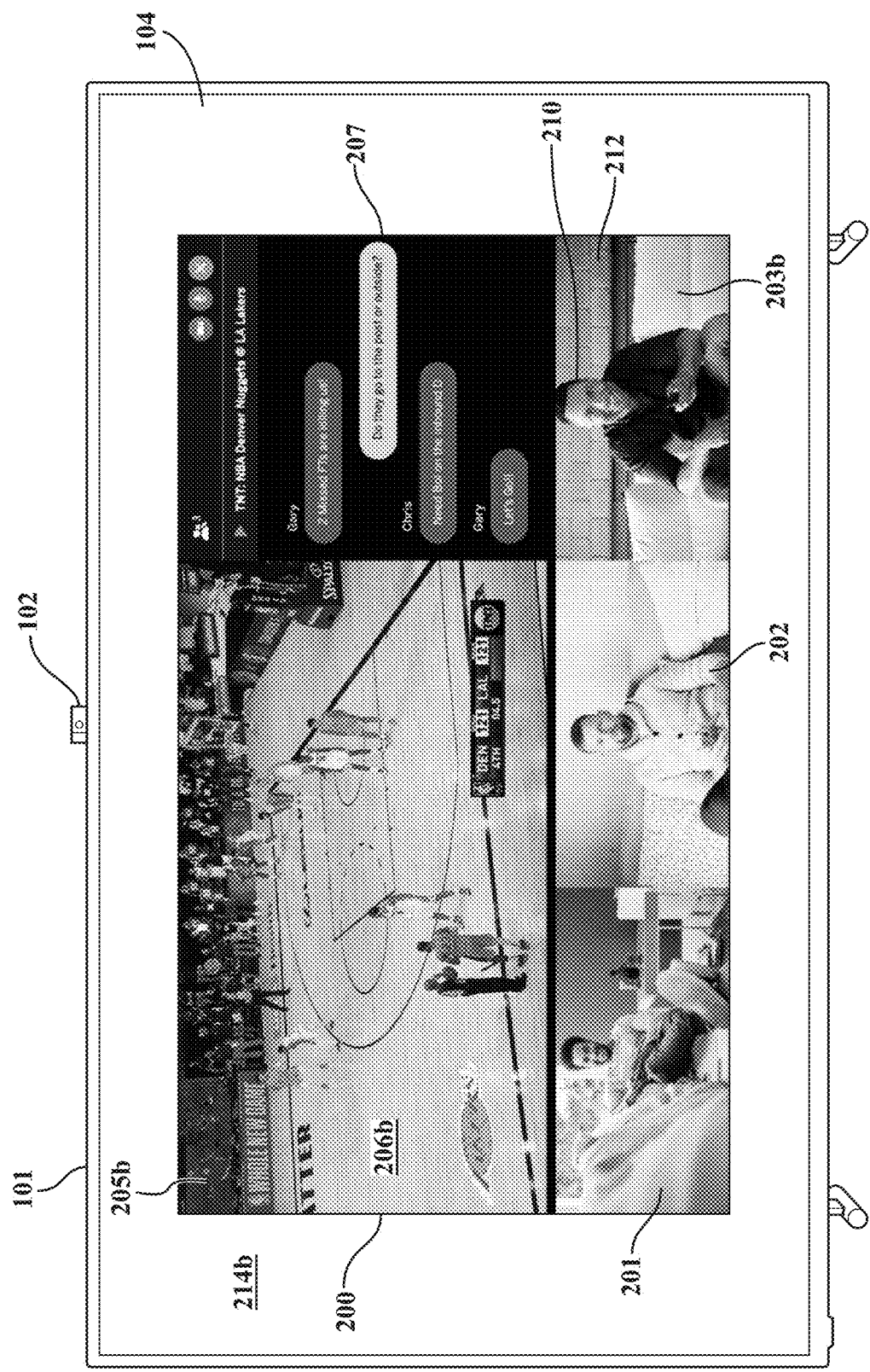
FIG. 2B depicts the video watch party of FIG. 2A in which the picture has been shrunk to provide a rectangular border frame of white pixels to illuminate one of the subjects being live-streamed during the watch party.

A further example of a method of illuminating a subject is depicted in FIGS. 2A-2B. Referring to FIG. 2A, the system of the disclosure is being used by three friends as shown in 201, 202, and 210 who are watching a sporting event shown in main portion 205a of display 104 together, even though each of them is located remote to the others, in what could colloquially be called a "watch party." In this example, TV 101 is being viewed by viewer 210 shown in window 203a. Each viewer 201, 202, and 210 appears in a corresponding window within the picture field 206a. Text message window 207 allows the viewers 201-203 to communicate with one another via text messaging during the game being displayed in main display region 205b.

In FIG. 2A viewer 210 appears dark and is not well differentiated from his surrounding environment 212. Thus, viewer 210 has used his remote control (or alternatively, an associated app on a mobile device or voice command) to command the TV 101 to provide additional subject lighting. Using the technique described above with respect to FIGS. 1B and 1C, in FIG. 2B a rectangular frame of border pixels 214b is created on display 104, and the size of picture field 206b is reduced accordingly relative to the size of picture field 206a in FIG. 2A. The RGB values of border pixels 214b are each set to 100 percent of their maximum values and provide a source of white light to illuminate viewer 210. Thus, viewer 210 appears brighter in FIG. 2B than FIG. 2A. The size of the frame of border pixels 214b is based on at least one captured image subject pixel parameter value for the subject pixels in a captured image of viewer 210 exclusive of his surrounding environment 212. In certain examples, the at least one captured image subject pixel parameter value for the subject pixels is an average luminance value ($Y_{avg}$) across the subject pixels, which is calculated from the individual luminance values ($Y(x, y)$) for the subject pixels. $Y_{avg}$ is compared to a setpoint value $Y_{sp}$ to determine the size of the border frame. It should be noted that the "surrounding environment" 212 is the physical environment in which viewer 210 is located which may or may not correspond to the images surrounding viewer 210 on display 104.

Figure 3A:
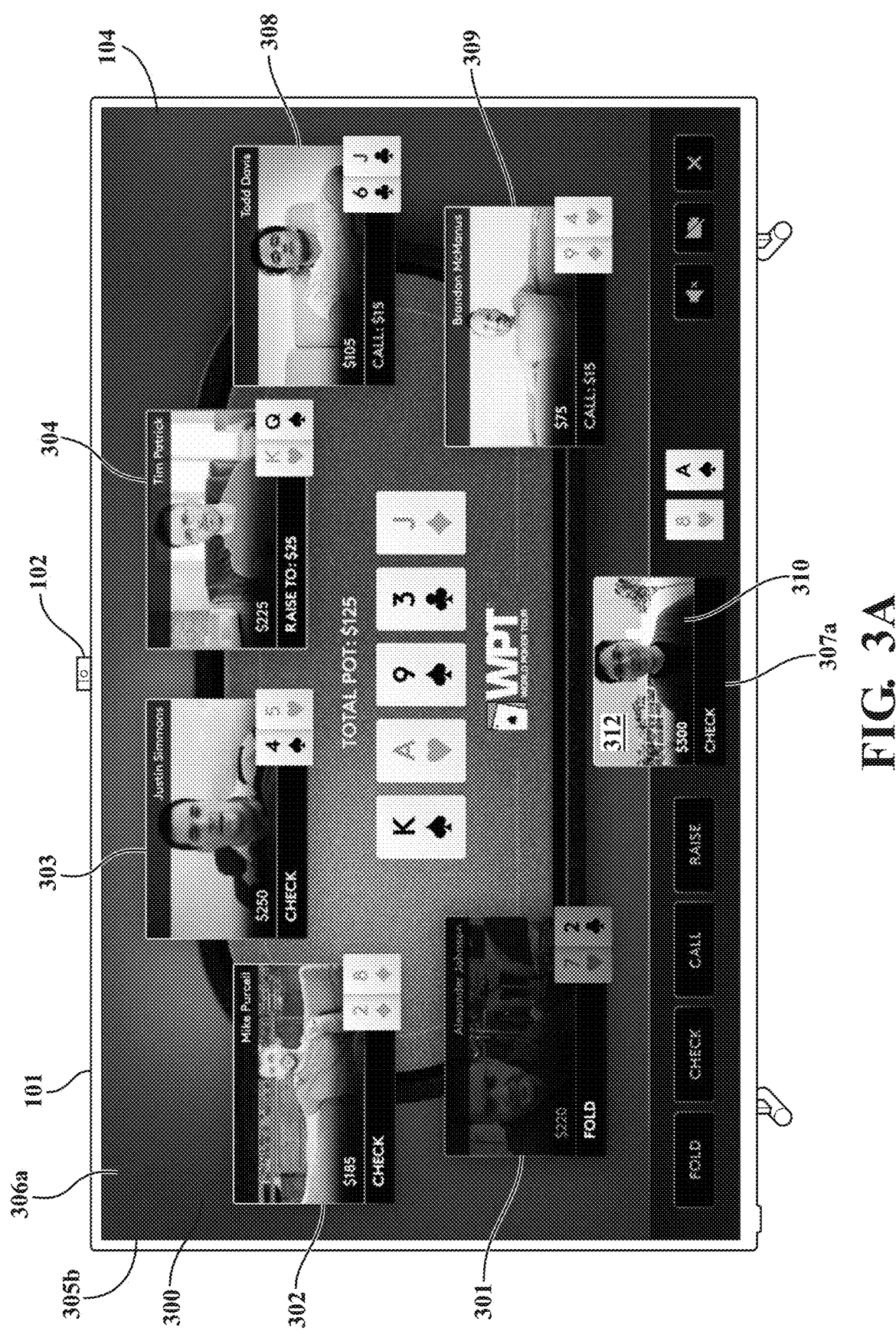
FIG. 3A is a front elevational view of a video display showing a video poker game played by participants from different locations.

Another potential application that is enhanced by the methods taught by the present disclosure may be seen in FIG. 3A where another example of its use is depicted. As can be seen, a group of friends, all of whom are located remotely to each other, are competing using a network-connected application 300 of a poker game. A game region 305a consumes the entire picture field 306a and display 104. However, seven on-screen windows are provided which overlay the game region 305a. The video stills comprising game region 305a shown in FIG. 3A are from the application as they would be seen on the home screen of player 310 (who appears in on-screen window 307a). It is well known that facial expressions are a useful tool to read other players' reactions when competing in certain card games such as poker, so enabling friends to clearly see each other's faces when competing with them is essential for fair play.

Figure 3B:
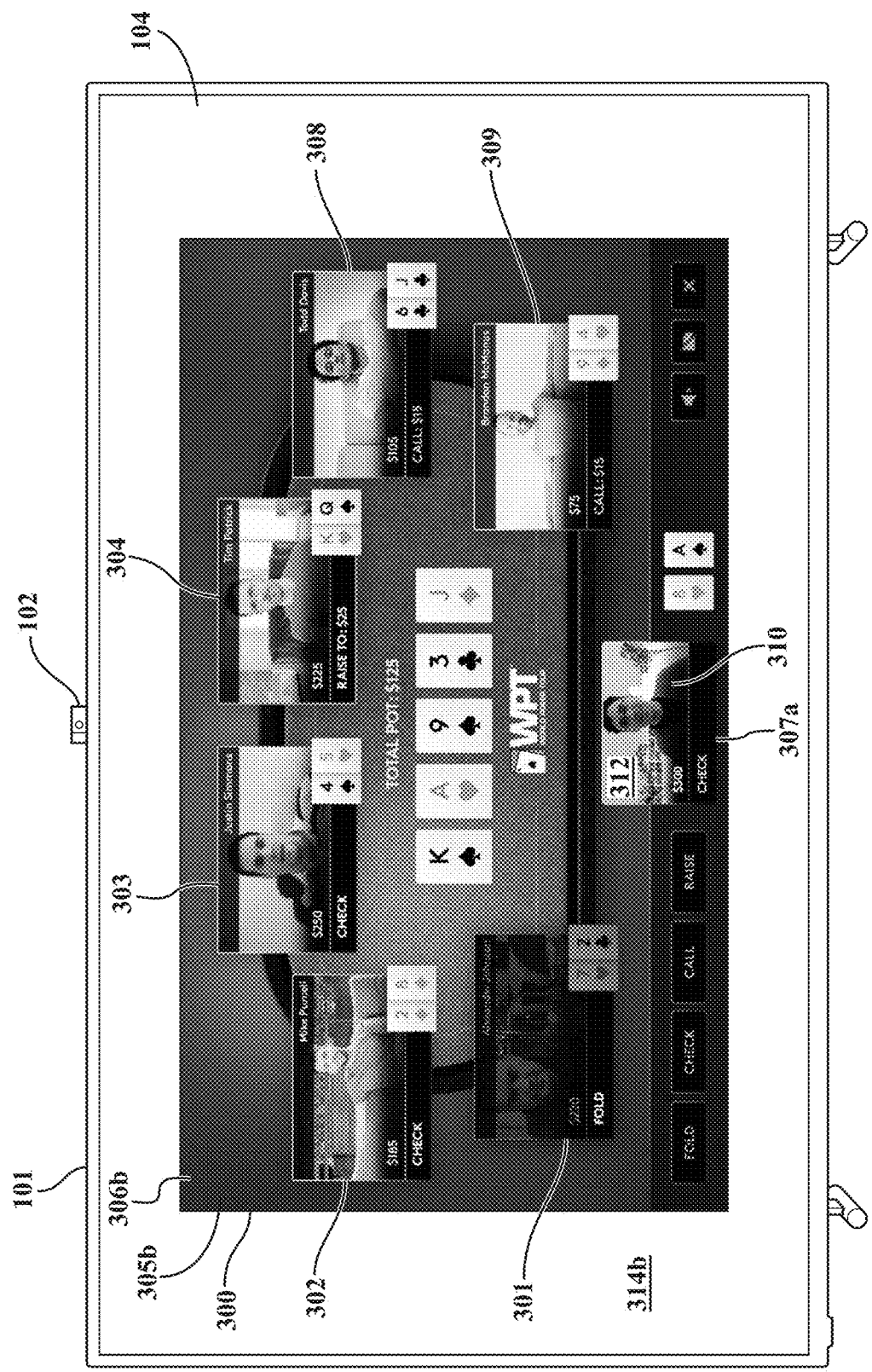
FIG. 3B depicts the video poker game of FIG. 3A in which the picture has been shrunk to provide a rectangular border frame of white pixels to illuminate a poorly-illuminated participant viewing the display.

In this example, a remote player "Alexander" 301 on the bottom left of the screen, has "folded" and dropped out and therefore the poker game application has dimmed his video. "Tim" the remote player 304 at the top of the display 104 has just raised. Meanwhile, player 310 is wearing dark clothing and is also backlit by a bright white wall directly behind him. As a result of the ambient lighting at his location, his face is unclear and assume in this example that one or more of the remaining players still in the game 302, 303, 304, 308, or 309 have complained that he is not clearly visible. Therefore, in this example, that player 310 commands the TV to increase brightness, which causes the system of the disclosure to reduce the size of the screen viewing area used by the poker application, and as depicted in FIG. 3B, the system of the disclosure reduces the size of picture field 306b to create a frame of border pixels 314b (each preferably having equal and maximum RGB values) that illuminate player 310 to provide better lighting of his face prior to continuing the game. In preferred examples, the number of pixels used as border pixels 314b is determined based on at least one captured pixel parameter value from a captured image or images of viewer 310 exclusive of his environment 312. In certain examples, the at least one captured image subject pixel parameter value is an average pixel luminance ($Y_{avg}$) for the subject pixels, which may be calculated from the individual luminance ($Y(x, y)$) values of the subject pixels. In other examples, the at least one captured image pixel parameter value is a pixel luminance value and the pixel luminance values corresponding to viewer 310 (exclusive of pixels 312 for his surrounding environment) are averaged and compared to a desired set point $Y_{sp}$ to determine the number of border pixels 314b. If the subject lighting remains unsatisfactory to the other players 302, 303, 304, 308, and 309, player 310 can again use his remote control, voice commands, mobile phone app, etc. to request additional subject lighting on himself by expanding the rectangular frame of border pixels 314b and reducing the size of picture field 306b. The request will change the value of $Y_{sp}$.

Figure 4:
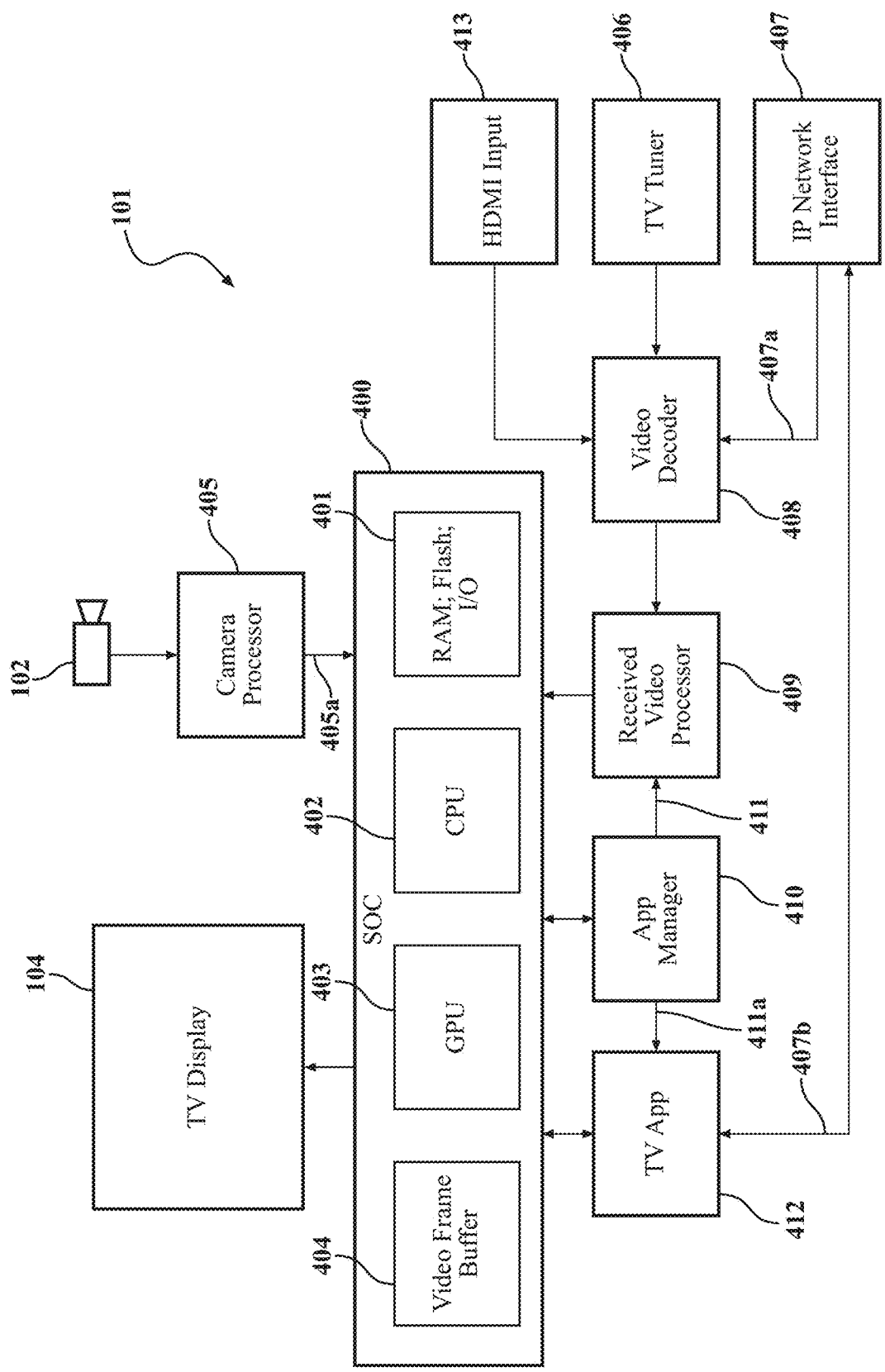
FIG. 4 is a block diagram of the system of the disclosure showing the central processing unit and supporting processing components of a smart TV which implement methods of using video display pixels to selectively illuminate a subject being recorded and/or live-streamed with a camera associated with the TV.

In all these examples, the system of the disclosure utilizes video scaling of the incoming video stream in addition to the scaling of the local camera, which could be built into the television or attached to it. In FIG. 4, the system of the disclosure is shown as a block diagram providing the necessary functions of image reception, image manipulation (scaling primarily in this disclosure), and software application (app) execution. The embodiment depicted in FIG. 4 is representative of a smart TV system and is provided for example only. The block diagram of FIG. 4 is not intended to restrict the disclosure to this schematic.

The one or more instances of video camera 102 in combination with the camera processor 405 associated with the smart TV 101 provides digital picture information 405a to the processing system of the TV display 104 where a processing system is typically implemented as a system-on-a-chip (SOC) 400 consisting of a CPU 402, a Graphical Processing Unit (GPU) 403, RAM/permanent storage (flash) 401, a video frame buffer 404, and other necessary elements for use in a smart TV. The digital picture information 405a (video stream) includes captured image data of viewers and their environment and may be processed by App Manager 410. App Manager 410 operates in the memory of the SOC 400 which processes the incoming camera video stream 405a in order to scale and place the picture in an appropriate location in the Video Frame Buffer 404. Buffer 404 provides the video images to the TV Display at the appropriate video frame rate for the region of operation (30 or 60 frames per second (fps) in the North America and 25 or 50 fps for most of the rest of the world.)

The App 412 may be one of many apps, including one for executing a video calling or conferencing application such as depicted in FIG. 1A or executing an entertainment application such as a video "watch party" as depicted in FIG. 2A or further executing a video game such as poker incorporating players in remote locations as depicted in FIG. 3A. The App Manager 410 controls—via Received Video Processor 409—a video broadcast received by the TV Tuner 406, IP Network Interface 407, or HDMI Input 413 (from a set-top box) when the disclosure is used in the "watch party" mode of FIG. 2A which incorporates a received television program. Furthermore, the App Manager 410 processes any other information to be incorporated into the display of the "watch party" group such as social media feeds such as text messages or Twitter feeds, among others. In other embodiments, such as the examples of FIG. 1A and FIG. 3A, App Manager 410 may be processing video received by the smart TV over the Internet via IP Network Interface 407 or via an IP set-top connected to HDMI Input 413.

In all examples, the App Manager 410 does, among other things, the processing of the composite video output of TV App 412 so that the composite video picture involving local and remote video sources and whatever other elements such as graphic overlays generated by TV App 412 are scaled to a smaller dimension of the TV Display 104. The border pixel areas 114b, 114c, 214b, and 314b are then controlled by App Manager 410 to increase luminance (intensity) and, optionally, apply a color tint. The App Manager 410 may direct the GPU 403 of SOC 400 to scale the picture output of TV App 412 by an appropriate amount such as, by example only, 80%. The App Manager 410 then outputs, for example, white pixel values for the border pixels 114b, 114c, 214b, and 314b the scaled down video picture field 106b, 106c, 206b, and 306b thus providing beneficial lighting for the camera 102 to provide a better-quality video picture to the other TVs participating in the group event.

In another embodiment previously illustrated with respect to FIG. 1D, App Manager 410, instead of causing the video picture information of a two-way video app to be scaled down, may instead direct the video processing of the smart TV to increase the luminance of the entire video picture sent the TV Display 104, thereby increasing the light projected upon the persons directly in front of the smart TV 101 and providing better quality output from the camera 102.

Figure 5A:
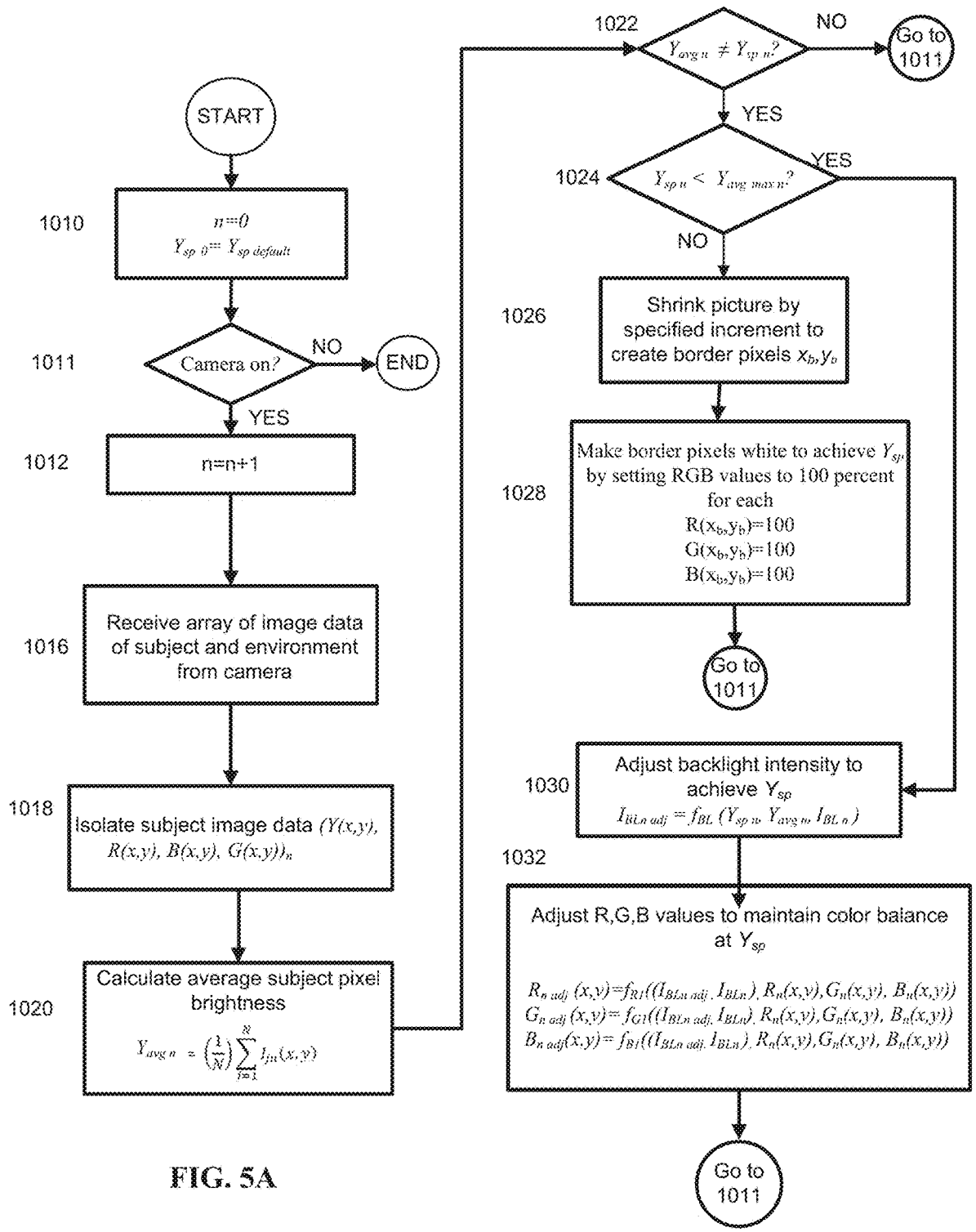
FIG. 5A is a flow diagram depicting a method of using an LED backlight in an LCD TV to selectively illuminate a subject being recorded and/or live-streamed by a camera associated with the video display.

Referring to FIG. 5A, a method of illuminating a subject using the LED backlight of an LCD TV is depicted. The LCD TV comprises an LCD panel that defines a plurality of video display pixels, each comprising a red, blue, and green subpixel with respectively adjustable R, G, and B values. An LED backlight array is provided and comprises a plurality of LEDs arranged in alignment with the LCD panel so that each LED is physically proximate a group of LCD pixels and provides light to it. In accordance with the method, adjustments to at least one video display pixel parameter value are made based on the average captured pixel intensity $Y_{avg\ max}$ for captured subject pixels exclusive of the subject's surrounding environment.

In step 1010 an image index n is initialized, and a current setpoint for the average captured pixel intensity is initialized to a default value $Y_{sp}$ default. A determination is made as to whether camera 102 is on. Step 1011. If it is not, the method ends. Otherwise, the image index n is incremented. Step 1012. Although not separately shown in the figure, any adjusted RGB values ($R_{n\ adj}$, $G_{n\ adj}$, $B_{n\ adj}$) and backlight intensity values ($I_{Bl\,n\,adj}$) used in a prior iteration of the steps of FIG. 4A would be stored as the current value, i.e., as $R_n$, $G_n$, $B_n$, and $I_{Bl\,n}$, respectively).

In step 1016 an array of image data of the subject and his or her surrounding environment is received. For example, in FIGS. 1A-D subjects 110 are people in the on-screen window 103a, and the environment 110 is the walls behind them. The method of FIG. 5A is intended to base its adjustment of video display pixels on the level of illumination on the subjects 110 exclusive of their surroundings 112. Thus, in step 1018 image data for subjects 110 is isolated from the captured image provided by camera 102, for example, using facial recognition software and/or other anatomical recognition software. In one preferred example, the image data is location specific in the x, y plane of the display 104 and includes a luminance value Y(x, y), and RGB values R(x, y), G(x, y), and B(x, y). The luminance is typically in units of power or energy per unit area (e.g., W/m$^2$). However, it may be expressed as a dimensionless number based on the range of its digital representation (e.g., a value from 0-255). RGB values are typically expressed as dimensionless normalized intensity values based on a color model in which red, blue, and green are combined in varying proportions to create other colors.

In step 1020 the average pixel luminance of the subjects in the x, y plane (the plane of the TV display 104) is determined as follows:

$$Y_{avg\,n} = \frac{1}{N}\sum_{j=1}^{N} Y_{jn}(x,y) \qquad (1)$$

wherein, $Y_{avg\,n}$=average luminance of subject pixels (W/m$^2$) in the nth image;
  $Y_{jn}(x, y)$=luminance of jth pixel in nth image set at location x, y (W/m$^2$);
  N=total number of pixels (dimensionless);
  j=pixel index (dimensionless); and
  n=captured image index (dimensionless).

As indicated previously, luminance values Y may also be expressed in dimensionless numbers based of its digital representation (0-255) and the percentage of its full range value. In step 1022 the average pixel luminance $Y_{avg}$ is compared to a setpoint $Y_{sp}$ which is a desired value of the average pixel luminance. In certain examples, $Y_{sp}$ is pre-configured in smart TV 101. In the same or other embodiments, $Y_{sp}$ is user adjustable. If the average pixel luminance value $Y_{avg}$ is the same as the setpoint value $Y_{sp}$, control transfers to step 1011 so another image can be processed. Step 1022. If the average pixel luminance value differs from the setpoint, control transfers to step 1024, and the setpoint is compared to the maximum average pixel luminance value $Y_{avg\,max\,n}$. The maximum average pixel luminance value is a luminance value at which any further luminance increases will degrade the image of the subject, for example, by making the subject appear "washed out". Therefore, it is undesirable to increase pixel luminance values in the picture field 106a, 206a, and 306a such that $Y_{avg}$ exceeds $Y_{avg\,max\,n}$. When that constraint is reached, the method will begin shrinking the picture field 106a to create border pixels 114b as a means of increasing the subject lighting. Thus, when step 1024 returns a value of NO, the picture field 106b is reduced in size in step 1026 to create border pixels $x_b$, $y_b$. In step 1028 the R, G, B values of each border pixel 114b are maximized (set to 100 percent of their maximum value, which is 255) and set to equal values to create border pixels 114b that are white. In the case of LCD TVs with multiple, independent LED backlighting zones, depending on the configuration of the zones and the size of the picture field 106b, the backlighting intensities for the border pixels 114b may be increased relative to pixels in the picture field 106b, and in some examples are maximized. As also mentioned previously, the RGB values and/or luminance Y may be changed to address any changes to the perceived color balance and contrast of the scene within picture field 106b.

Control then transfers to step 1011 to process another image. In preferred examples, the number of border pixels 114b is determined based on the average luminance setpoint $Y_{sp\,n}$, the current average pixel luminance $Y_{avg\,n}$, and the current LED backlight intensity $I_{BL\,n}$ with the RGB values of the border pixels 114b maximized. The skilled person knows that luminance is also known as intensity and is represented by uppercase Y. Luminance can be related to RGB intensity values by using the following weighted sum: Y=0.3R+0.59G+0.11B. Alternatively, instead of using a predictive algorithm, fixed numbers of border pixels can be added and progressively incremented until $Y_{avg\,n}=Y_{sp}$.

If step 1024 returns a value of YES, control transfers to step 1030, and the LED backlight intensity (which is assumed to be constant at all pixel locations) is increased, as illustrated in FIG. 1D. The backlight intensity is increased based on the following relationship:

$$I_{BLn\,adj}=f_{BL}(Y_{sp\,n}, Y_{avg\,n}, I_{BL\,n}) \qquad (2)$$

wherein, $I_{BLn\,adj}$=new (adjusted) LED backlight intensity (W/m$^2$);
  $f_{BL}$=Backlight intensity adjustment function;
  $Y_{avg\,n}$=average captured pixel luminance for subject;
  $Y_{sp\,n}$=setpoint (desired) for average value of captured pixel luminance values for subject (W/m$^2$); and
  $I_{BL\,n}$=current LED backlight intensity (W/m$^2$).

In one example, the backlight intensity function is a simple ratio $$I_{BLn\,adj}=I_{BLn}(Y_{sp}/Y_{avg\,n}) \qquad (3)$$

Adjusting the LED backlight intensity changes pixel luminance (Y) and can impact the emitted color from the pixels. Thus, in certain examples, the RGB values of the adjusted pixels are also adjusted to maintain the same color balance of red, green, and blue in the emitted colors and to maintain $Y_{avg}$ at $Y_{sp}$. The adjustments are preferably based on the current and previous values of the backlight intensity ($I_{BLn}$ and $I_{BLn-1}$, respectively), and the current RGB values:

$$R_{n\,adj}(x,y)=fR1(I_{BL\,n\,adj}, I_{BL\,n}, R_n(x,y)G_n(x,y)B_n(x,y)) \qquad (4)$$

$$G_{n\,adj}(x,y)=fG1(I_{BL\,n\,adj}, I_{BL\,n}, R_n(x,y)G_n(x,y)B_n(x,y)) \qquad (5)$$

$$R_{n\,adj}(x,y)fB1(I_{BL\,n\,adj}, I_{BL\,n}, R_n(x,y),G_n(x,y),B_n(x,y)) \qquad (6)$$

wherein, fR1, fG1, and fB1 are functions relating intensity and RGB values
  $I_{BLn\,adj}$=adjusted backlight intensity (W/m$^2$);
  $I_{BLn}$=backlight intensity prior to adjustment (W/m$^2$); and
  R(x, y), G(x, y), and B(x, y) are dimensionless RGB values.

Figure 5B:
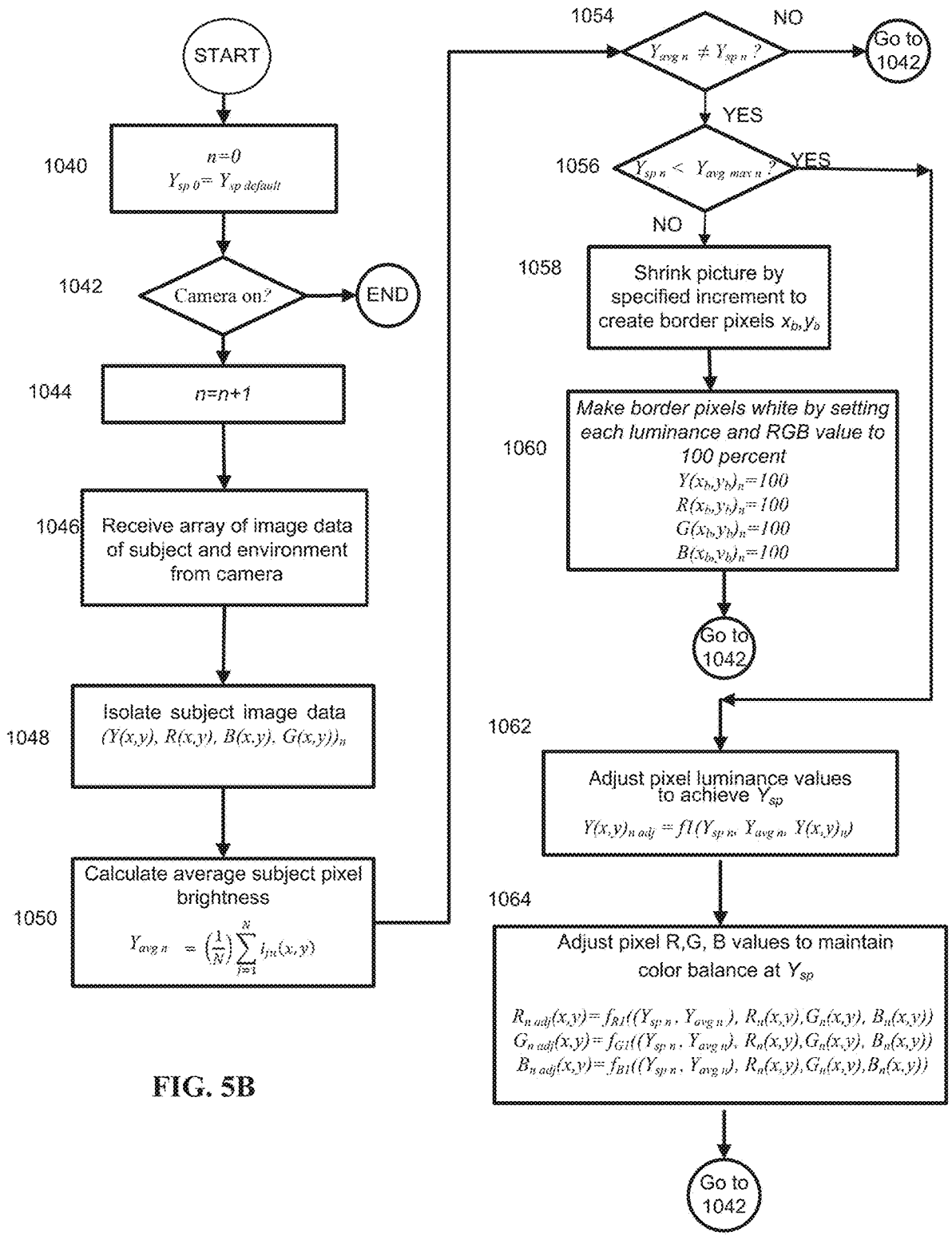
FIG. 5B is a flow diagram depicting a method of using adjusting the intensities of OLED pixels in an OLED TV to selectively illuminate a subject being recorded and/or live-streamed by a camera associated with the video display.

Referring to FIG. 5B, a method of illuminating a subject using an OLED TV is depicted. Steps 1040, 1042, 1044, 1046, 1058, 1050, 1054, 1056, 1058, and 1060 are the same, respectively, as steps 1010, 1011, 1012, 1016, 1018, 1020, 1022, 1024, 1026, and 1028 in FIG. 5A. If the average captured subject pixel luminance set point $Y_{sp}$ n is less than the maximum average pixel luminance $Y_{avg\,max\,n}$ in step 1056, control transfers to step 1062. In step 1062 the luminance values of each pixel in the picture field 106a are adjusted to achieve a value of $Y_{avg\ n}$ that is equal to $Y_{sp}$.

$$Y(x,y)_{n\ adj} = f_I(Y_{sp\ n}, Y_{avg\ n}, Y(x,y)_n) \quad (7)$$

wherein, $Y_{sp\ n}$ and $Y_{avg\ n}$ are as described previously.

$f_I$ is a function relating the adjusted pixel luminance to the current luminance, the set point of the average luminance, and the average luminance.

$Y(x, y)_n$ = the pixel luminance value of the OLED pixel a location x, y (W/m²); and $Y(x, y)_{n\ adj}$ = adjusted luminance value of the OLED pixel at location x, y (W/m²).

In one example, fI is a simple ratio function:

$$Y(x,y)_{n\ adj} = [Y(x,y)_n](Y_{sp\ n}/Y_{avg\ n}) \quad (8)$$

The adjustment to the individual pixel luminance values can affect the emitted color as perceived by the viewer. To maintain the same color balance the RGB values of the pixels are preferably adjusted as follows:

$$R_{n\ adj}(x,y) = fR2(Y(x,y)_{n\ adj}, Y(x,y)_n, R_n(x,y), G_n(x,y), B_n(x,y)) \quad (9)$$

$$G_{n\ adj}(x,y) = fG2(Y(x,y)_{n\ adj}, I(x,y)_n, R_n(x,y), G_n(x,y), B_n(x,y)) \quad (10)$$

$$B_{n\ adj}(x,y) = fB2(Y(x,y)_{n\ adj}, Y(x,y)_n, R_n(x,y), G_n(x,y), B_n(x,y)) \quad (11)$$

wherein, fR2, fG2, and fB2 are, respectively, functions that relate intensity values to color values for OLED TVs. Suitable functions include Y=0.3R+0.59G+0.11B.

As shown above, the present disclosure addresses the unmet needs of video conferencing by utilizing the TV display itself as a source of illumination for the subject who is being recorded or live-streamed.

What is claimed is:

1. A video conferencing system, comprising:
    a video display, the video display comprising a plurality of video display pixels, each video display pixel having a plurality of video display pixel parameter values;
    a camera operatively connected to the video display and operable to capture images of a field of view of the camera, the field of view of the camera including a subject and a surrounding environment;
    a controller operatively connected to the camera and the video display and programmed to selectively illuminate the subject by adjusting at least one of the plurality of video display pixel parameter values based on captured images of the subject exclusive of the surrounding environment.

2. The video conferencing system of claim 1, wherein the at least one of the pixel parameter values comprises a pixel luminance value.

3. The video conferencing system of claim 2, wherein the at least one of the pixel parameter values comprises RGB color values.

4. The video conferencing system of claim 1, wherein the video display comprises an LCD panel comprising the pixels and an LED backlight, the LED backlight comprising an array of LEDs each of which is operable to project light to corresponding ones of the video display pixels, and the controller is programmed to adjust a pixel brightness value of the video display pixels by adjusting an intensity value of the LED backlight.

5. The video conferencing system of claim 1, wherein the video display comprises an OLED panel comprising the OLED video display pixels, and the controller is programmed to adjust pixel luminance values of the OLED video display pixels.

6. The video conferencing system of claim 5, wherein the at least one of the pixel parameter values comprises RGB color values, and the controller is programmed to adjust RGB values of the OLED video display pixels to maintain selected ratios of R:G and R:B.

7. The video conferencing system of claim 1, wherein the controller is further programmed to adjust the at least one video display pixel parameter values based on a captured image pixel parameter set point value.

8. The video conferencing system of claim 7, wherein the video display pixel parameter set point value is user adjustable.

9. The video conferencing system of claim 1, wherein the plurality of video display pixels comprises a picture field of the video display pixels, and the controller is configured to create a frame of border pixels by reducing a size of the picture field of video display pixels based on a set point value of at least one captured image pixel parameter of the subject exclusive of the surrounding environment.

10. The video conferencing system of claim 9, wherein the controller is programmed to set RGB values for each of the border pixels to 100 percent for each of R, G, and B.

11. The video conferencing system of claim 1, further comprising a computer readable medium having non-transitory computer executable instructions thereon which, when executed by a processor, identify captured image pixels of the subject corresponding to a human face.

12. The video conferencing system of claim 1, further comprising a computer readable medium and a processor, the computer readable medium having non-transitory computer executable instructions stored thereon which, when executed by the processor, calculate an average luminance of captured image pixels for captured images in the field of view of the camera, wherein the captured image pixels correspond to the subject exclusive of the environment.

13. The videoconferencing system of claim 1, wherein the controller is programmed to isolate image data corresponding to the subject's anatomy from the captured image data and to selectively illuminate the subject by adjusting at least one of the plurality of video display pixel parameter values based solely on the isolated image data corresponding to the subject's anatomy.

14. A method of illuminating a subject, comprising:
    receiving images of a subject in an environment located within a field of view of a camera operatively connected to a video display;
    adjusting at least one video display pixel parameter value to adjust an intensity of light projected from the video display onto the subject based on image data corresponding to the subject exclusive of the environment in the received images.

15. The method of claim 14, wherein the at least one video display pixel parameter value is a pixel luminance value.

16. The method of claim 14, wherein the step of adjusting the at least one video display pixel parameter value comprises adjusting an LED backlight intensity value.

17. The method of claim 16, wherein the step of adjusting an LED backlight intensity value comprises adjusting the LED backlight intensity value based on an average luminance of received image pixel data corresponding only to the subject's anatomy.

18. The method of claim 14, wherein the step of adjusting the at least one video display pixel parameter values comprises adjusting OLED pixel luminance values.

19. The method of claim 14, wherein the step of adjusting at least one video display pixel parameter value comprises reducing a size of a picture field within the video display pixels to create a frame of border pixels.

20. The method of claim 19, further comprising adjusting RGB values for each of the border pixels to 100 percent for each of R, G, and B.

21. The method of claim 14, wherein the step of adjusting at least one video display pixel parameter value to adjust an intensity of light projected from the video display onto the subject is further based on a setpoint value of a received image pixel parameter.

22. The method of claim 21, further comprising adjusting the setpoint.

23. The method of claim 14, further comprising isolating image data corresponding to the subject's anatomy from the received images, wherein the image data corresponding to the subject exclusive of the environment is isolated image data only.

24. A video conferencing system, comprising:
  a video display, wherein the video display comprises a plurality of video display pixels, each video display pixel comprising a plurality of video display pixel parameter values, the plurality of video display pixel parameter values including a luminance value;
  a camera having a field of view and being operatively connected to the video display and operable to capture images of a subject in the camera's field of view, each of the captured images of the subject comprising an array of captured subject image pixels, each captured image pixel corresponding to a plurality of captured image pixel parameters; and
  a controller operatively connected to the camera and to each video display pixel, wherein the controller is configured to selectively illuminate the subject by adjusting at least one of the plurality of video display pixel parameter values for a set of video display pixels based only on the captured subject image pixel parameter values of the corresponding array of captured subject image pixels and a setpoint value of at least one captured image pixel parameter in the plurality of captured image pixel parameters, wherein the captured image pixels correspond to the subject's anatomy.

25. The video conferencing system of claim 24, wherein the at least one of the video display pixel parameter values comprises a pixel luminance value.

26. The video conferencing system of claim 25, wherein the at least one of the pixel parameter values comprises RGB color values.

27. The video conferencing system of claim 24, wherein the video display comprises an LCD panel comprising the pixels and an LED backlight, the LED backlight comprises an array of LEDs each of which is operable to project light to corresponding ones of the video display pixels, and the controller is programmed to adjust a pixel luminance value of the video display pixels by adjusting an intensity value of the LED backlight.

28. The video conferencing system of claim 24, wherein the video display comprises an OLED panel, the video display pixels are OLED video display pixels, and the controller is programmed to adjust pixel luminance values of the OLED video display pixels.

29. The video conferencing system of claim 28, wherein the at least one of the video display pixel parameter values comprises RGB color values, and the controller is programmed to adjust RGB values of the OLED video display pixels to maintain selected ratios of R:G and R:B.

30. The video conferencing system of claim 24, wherein the controller is further programmed to adjust the at least one video display pixel parameter values based on a captured image pixel parameter set point value.

31. The video conferencing system of claim 30, wherein the video display pixel parameter set point value is user adjustable.

32. The video conferencing system of claim 24, wherein the plurality of video display pixels comprises a picture field of the video display pixels, and the controller is configured to create a frame of border pixels by reducing a size of the picture field of video display pixels based on the set point value of the at least one of the plurality of video display pixel parameter values and captured images of the subject exclusive of the surrounding environment.

33. The video conferencing system of claim 32, wherein the controller is programmed to set RGB values for each of the border pixels to 100 percent for each of R, G, and B.

34. The video conferencing system of claim 24, further comprising a computer readable medium having non-transitory computer executable instructions thereon which, when executed by a processor, identify captured image pixels of the subject corresponding to a human face.

\* \* \* \* \*